United States Patent [19]

Kusano et al.

[11] Patent Number: 5,290,378
[45] Date of Patent: Mar. 1, 1994

[54] METHOD FOR PREPARING A RUBBER-BASED COMPOSITE MATERIAL

[75] Inventors: Yukihiro Kusano, Tokorozawa; Masato Yoshikawa, Kodaira; Kazuo Naito, Kawasaki; Satiko Okazaki, No. 20-11, Takaido Higashi 2-chome, Suginami-ku, Tokyo; Masahiro Kogoma, No. 843-15, Shimoniikura, Wakou-shi, Saitama-ken, all of Japan

[73] Assignees: Bridgestone Corporation, Tokyo; Satiko Okazaki, Tokyo; Masahiro Kogoma, Saitama, all of Japan

[21] Appl. No.: 658,665

[22] Filed: Feb. 21, 1991

[30] Foreign Application Priority Data

Mar. 14, 1990 [JP] Japan .................. 2-63531

[51] Int. Cl.⁵ .................. B32B 31/00; B05D 3/06
[52] U.S. Cl. .................. 156/272.6; 156/910; 156/307.5; 156/307.7; 156/334; 250/324; 427/490; 427/491; 427/569; 152/565
[58] Field of Search .................. 156/272.6, 285, 910, 156/307.5, 309.6, 307.7, 334; 250/324; 427/39–41, 255.1, 248.1, 412–414, 411, 488, 490–491, 569; 152/565; 428/420, 515–517; 204/156, 192.1, 192.38, 192.15

[56] References Cited

U.S. PATENT DOCUMENTS

| | | | |
|---|---|---|---|
| 3,650,874 | 3/1972 | Job et al. .................. | 156/335 |
| 3,899,378 | 8/1975 | Wragg et al. .................. | 156/309.6 X |
| 3,932,689 | 1/1976 | Watanabe et al. .................. | 156/330 |
| 4,013,532 | 3/1977 | Cormia et al. .................. | 204/192.15 |
| 4,328,324 | 5/1982 | Kock et al. .................. | 152/565 X |
| 4,374,694 | 2/1983 | Blenner et al. .................. | 156/272.6 |
| 4,396,450 | 8/1983 | Blenner et al. .................. | 156/272.6 |
| 4,598,022 | 7/1986 | Haque et al. .................. | 156/272.6 |
| 4,743,327 | 5/1988 | DeHaan et al. .................. | 156/272.6 |
| 4,772,348 | 9/1988 | Hirokawa et al. .................. | 156/272.6 |
| 4,898,638 | 2/1990 | Lugez .................. | 156/272.6 |
| 4,983,251 | 1/1991 | Haisma et al. .................. | 156/630 |
| 5,126,164 | 6/1992 | Okazaki et al. .................. | 427/491 |
| 5,151,142 | 9/1992 | Imai et al. .................. | 152/565 |

FOREIGN PATENT DOCUMENTS

| | | | |
|---|---|---|---|
| 710770 | 6/1965 | Canada .................. | 156/307.5 |
| 749314 | 12/1966 | Canada .................. | 156/307.4 |
| 63-202977 | 8/1988 | Japan . | |
| 63-138630 | 12/1989 | Japan . | |
| 1-306569 | 12/1989 | Japan . | |
| 2-15171 | 1/1990 | Japan . | |
| 63-166599 | 1/1990 | Japan . | |

Primary Examiner—David A. Simmons
Assistant Examiner—Chester T. Barry
Attorney, Agent, or Firm—Birch, Stewart, Kolasch & Birch

[57] ABSTRACT

A method for preparing a rubber-based composite material by joining a base material and a rubber composition together by heat pressure bonding can achieve strong bonding without using any adhesives, wherein a monomer is polymerized by atmospheric-pressure glow discharge plasma technique to form a polymerized film having unsaturated bonds on the surface of the base material and then the rubber composition is bonded to said polymerized film by heat pressure bonding to join the base material and the rubber together.

20 Claims, 1 Drawing Sheet

METHOD FOR PREPARING A RUBBER-BASED COMPOSITE MATERIAL

BACKGROUND OF THE INVENTION

1. Field of the Invention

The present invention relates to a method for preparing a rubber-based composite material by joining a rubber composition to a base material by heat pressure bonding without any adhesives.

2. Description of the Prior Art

The conventional methods adopted for adhering a base material and a rubber composition together by heat pressure bonding to prepare a rubber-based composite material include the following ones:

(a) applying an adhesive to the surface of a base material, or (b) using a rubber composition which can directly react with a base material However, the method (a) has problems that a solvent is used in order to apply an adhesive and that many steps are required. In addition, the method (a) can not be used if a strict temperature strain is imposed on the bonded portion.

On the other hand, although the method (b) does not use any adhesives, it has drawbacks that base materials to be bonded to the rubber composition are restricted and that the physical properties of the rubber may be deteriorated because of the restricted formulation of the rubber composition for directly reacting with a base material.

SUMMARY OF THE INVENTION

Therefore, an object of the present invention is to provide a method for preparing a rubber-based composite material by joining a base material and a rubber composition together by heat pressure bonding, which can achieve strong bonding without using any adhesives. Another object of the present invention is to provide a method for preparing a rubber-based composite material in which the base material can be selected with no limitation on shape, quality and the like and the formulations of the rubber composition can be selected with no limitation on components, proportion and the like.

According to the present invention, there is provided a method for preparing a rubber-based composite material by bonding a rubber composition to a base material, wherein a monomer is polymerized by atmospheric-pressure plasma technique to form a polymerized film having unsaturated bonds on the surface of the base material and then the rubber composition is bonded to said polymerized film by heat pressure bonding to join the base material and the rubber composition together.

The inventors have found that in preparing a rubber-based composite material by bonding a rubber composition to a base material, they can firmly be bonded together without using any adhesives when a hydrocarbon monomer is polymerized by atmospheric-pressure glow discharge plasma technique to form a polymerized film having unsaturated bonds on the surface of the base material and the rubber composition is bonded to the above polymerized film by heat pressure bonding, because the polymerized film functions as a good bonding layer.

In more detail, since free electrons and in atmospheric-pressure glow discharge plasma have very high energy, chemical reactivity is very high. For example, a hydrocarbon compound such as methane, ethane or benzene which does not polymerize as it is can very easily be polymerized in atmospheric-pressure glow discharge plasma. Even when no polymerizable unsaturated bonds are contained in the monomer, unsaturated bonds can be formed in the plasma polymerized film. Furthermore, when a hydrocarbon compound containing at least one unsaturated bond is used as a monomer, it is possible to make many unsaturated bonds to remain in the plasma polymerized film. As described above, a polymerized film containing unsaturated bonds can easily and securely be formed by plasma polymerization.

Forming a plasma polymerized film having unsaturated bonds on the surface of a base material to be bonded to a rubber composition and then joining a rubber composition to the above polymerized film by heat pressure bonding enables the unsaturated bonds contained in the polymerized film to be crosslinked with the rubber composition by heat and pressure upon heat pressure bonding. Therefore, the base material and the rubber composition can firmly be bonded together since the above polymerized film functions as a good bonding layer.

This method requires no adhesives, and is characterized by that the formulations of a rubber composition to be bonded to a base material are scarcely limited because no special considerations are required for the rubber composition owing to the above bonding mechanism. Furthermore, since a polymerized film used as an bonding layer is formed by atmospheric-pressure glow discharge plasma technique, the film and a base material are in excellently close adhesion and the bonding layer can be formed on the surface of various solid base material.

BRIEF DESCRIPTION OF THE DRAWING

The above and other objects, features, and advantages of the present invention will be better understood from the following description taken in conjunction with the accompanying drawing, in which.

DETAILED DESCRIPTION OF THE INVENTION

Figure 1:
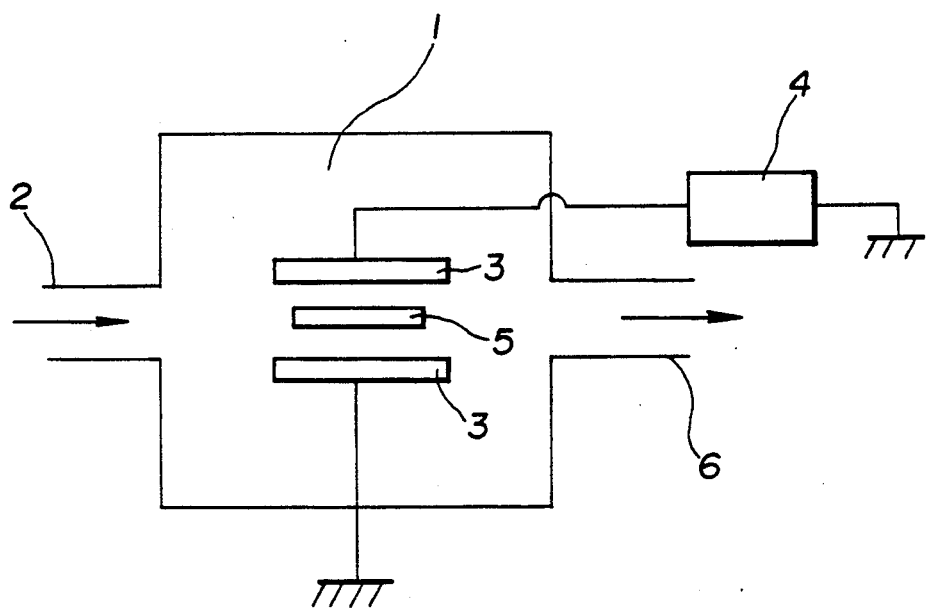
FIG. 1 is a diagram of a plasma discharge device used in Examples 1 to 3.

In the production of a rubber-based composite material according to the present invention, firstly a base material is placed in a treatment chamber, a monomer to be plasma polymerized is introduced into the treatment chamber and then a polymerized film having unsaturated bonds is formed on the surface of the base material by atmospheric-pressure glow discharge plasma technique.

As the atmospheric-pressure glow discharge plasma technique, a method disclosed in Japanese Patent Application Kokai Nos. 138630/1989, 166599/1988 and 202977/1988, can be used, for example. A big vacuum device is not necessary for the atmospheric-pressure plasma technique since the technique is carried out at a pressure about the atmospheric pressure. Furthermore, the technique can be used for base materials containing much water or gaseous plasticizers. Little heat generation occurs while the base material is treated by the atmospheric-pressure glow discharge plasma technique. Accordingly, the atmospheric-pressure glow discharge plasma technique has characteristics that it can be used for base materials having a low melting point and can easily form a polymerized film on a desirable portion of the base material.

The method of generating plasma may be any one which can generate plasma and enables a plasma polymerized film to be formed on a base material. Those methods include direct current glow discharge induced using internal electrodes, low-frequency discharge, high-frequency discharge induced using internal electrodes, external electrodes or coils, microwave discharge induced using a wave guide and electron cyclotron resonance discharge. In the method, discharge frequency is preferably above 100 Hz.

Any compound which results in the remaining of unsaturated bonds in a polymerized film after plasma polymerization can be used as the monomer. Examples of the monomer include saturated hydrocarbons, unsaturated hydrocarbons, cyclic hydrocarbons, aromatic hydrocarbons, or compounds having molecular structures similar to those or the above compounds are preferably used. It is also possible to use one of these compounds alone or in combination. For example, $C_nH_{2n+2}$ ($n \leq 1$, preferably $50 \leq n \leq 1$) (e.g., $CH_4$, $C_2H_6$, $C_3H_8$, $C_4H_{10}$, $C_5H_{12}$), $C_nH_{2n}$ ($n \leq 2$, preferably $50 \leq n \leq 1$) (e.g., $C_2H_4$, $C_3H_6$, $C_4H_8$, $C_5H_{10}$), $C_nH_{2n-2}$ ($n \leq 2$, preferably $50 \leq n \leq 2$) (e.g., $C_2H_2$, $C_3H_4$, $C_4H_6$, $C_5H_8$), those obtained by substituting some of the hydrogen atoms of these compounds by other functional groups such as halogen atoms (e.g., $C_4H_5Cl$) and those having benzene rings in the molecular structures such as $C_6H_6$ are preferably used. Of these compounds, $C_2H_4$, $C_3H_6$, $C_4H_8$, $C_6H_6$, $C_4H_5Cl$ and $C_7H_8$ are most preferable.

Although gases of these monomer may be used as they are, it is also effective in terms of the durability and stability of discharge, economy or the physical properties of a polymerized film to be formed to dilute the monomer gas with one of inert gases such as He, Ar and Ne and gases such $N_2$, $H_2$ and $O_2$ or a gaseous mixture of at least two of these gases. Of these gases, He is most preferably used.

A film polymerized by plasma according to the present invention can be formed by placing a substance to be treated in a treatment chamber wherein a plasma discharge area is formed and then continuously feeding the above monomer and, if required, a dilution gas into the treatment chamber.

In the present invention, a polymerized film can be formed by atmospheric-pressure glow discharge plasma technique by feeding the monomer and, if required, diluted monomer into the atmospheric-pressure treatment chamber.

The method of feeding the above monomer into the above treatment chamber is selected according to the temperature of the treatment chamber during plasma discharge and the state of the above monomer at ordinary or room temperature.

Specifically, when the above monomer is in a gaseous state at the temperature of a treatment chamber and at ordinary or room temperature, the monomer can as it is be fed into the treatment chamber. When the above monomer is in a liquid state at these temperatures, its vapor may be fed as it is into the treatment chamber when it has a relatively high vapor pressure or the liquid monomer may be bubbled with a dilution gas such as an inert gas to feed the liquid into the chamber. On the other hand, when the monomer is not gaseous and has a relatively low vapor pressure, it can be used after being converted into a gas or a state of relatively high vapor pressure by heating.

The treating time may be in the range of 0.01 to 20,000 seconds, preferably 1 to 5000 seconds. The thickness of the plasma polymerized film is preferably 0.001 to 1000 $\mu$m, more preferably 0.01 to 100 $\mu$m.

Base materials which can be bonded to a rubber composition by the method of the present invention using heat pressure bonding may be in any form such as plate, sheet, fiber or block and their quality may be any solid such as plastic, rubber, metal or ceramic irrespective of whether they are organic solids or inorganic solids.

The method of the present invention comprises forming a plasma polymerized film on the surface of a base material as described above and then adhering a rubber composition to the plasma polymerized film by heat pressure bonding to join the base material and the rubber together.

As a rubber ingredient contained in the rubber composition, one of natural rubber (NR) and synthetic rubbers having C—C double bonds in their structure or a mixture of at least two of these rubbers can be used. The above synthetic rubbers include polymers of conjugated diene compounds such as isoprene, butadiene and chloroprene including polyisoprene rubbers (IR), polybutadiene rubbers (BR) and polychloroprene rubbers; copolymers of the above conjugated diene compounds and vinyl compounds such as styrene, acrylonitrile, vinylpyridine, acrylic acid, methacrylic acid, alkyl acrylates and alkyl methacrylates including styrene-butadiene copolymer rubbers (SBR), vinylpyridine-butadiene-styrene copolymer rubbers, acrylonitrile-butadiene copolymer rubbers, acrylic acid-butadiene copolymer rubbers, methacrylic acid-butadiene copolymer rubbers, methyl acrylate-butadiene copolymer rubbers and methyl methacrylate-butadiene copolymer rubbers; copolymers of diene compounds and olefins such as ethylene, propylene and isobutylene [e.g., isobutylene-isoprene copolymer rubbers (IIR)]; copolymers (EPDM) of olefins and nonconjugated dienes (e.g., ethylene-propylene-cyclopetadiene ternary copolymers, ethylene propylene-5-ethylidene-2-norbornane ternary copolymers, ethylene propylene-1,4-hexadiene ternary copolymers); polyalkenamers (e.g., polypentenamers) produced by subjecting cycloolefins to ring-opening-polymerization; rubbers (e.g., polyepichlorohydrin rubbers which can be vulcanized) pruduced by subjecting oxirane rings to open-ring-polymerization; and polypropylene oxide rubbers. They also include halides of the above various rubbers such as chlorinated isobutylene-isoprene copolymer rubbers (Cl-IIR) and brominated isobutylene-isoprene copolymer rubbers (Br-IIR). Ring-opening-polymerization products of norbornane can also be used. In addition, it is possible to use a rubber blend prepared by mixing the above rubber with a saturated elastic material such as epichlorohydrin rubber, a polypropylene oxide rubber or a chlorosulfonated polyethylene.

The rubber compositions used herein may further contain fillers such as carbon black, silica, calcium carbonate, calcium sulfate, clay, diatomaceous earth, and mica usually in an amount of 0 to 200 parts by weight per 100 perts by weight of the rubber composition; softeners such as mineral oils, vegetable oils, and synthetic plasticizers; vulcanization aids such as stearic acid; anti-oxidants; and an effective amount of crosslinking agents such as sulfur in a conventional manner and amount depending on the particular purpose or application of the rubbery composite products.

The above rubber composition and a polymerized film formed on the surface of a base material can be bonded together when the rubber composition is bonded to the above polymerized film by heat pressure bonding and at the same time the rubber molecules are crosslinked. The heat bonding is carried out at a temperature of 50° and 300° C., preferably 100° to 250° C. and at a pressure of 0 to 5000 kg/cm$^2$, preferably 0 to 300 kg/cm$^2$.

EXAMPLE

Examples of the invention are given below by way of illustration and not by way of limitation.

EXAMPLES 1 to 3 and COMPARATIVE EXAMPLE

After films polymerized by atmospheric-pressure glow discharge plasma were formed on an O-polyethylene terephthalate (PET) sheet, a nylon sheet, a nylon cloth and a stainless-steel plate under conditions shown in Table 1 using a high-frequency plasma discharge device having external electrodes coated with an insulator shown in FIG. 1. Each of these base materials and a rubber composition having a formulation shown in Table 2 were joined together by heat pressure bonding under conditions of 145° C. and 40 minutes. After heat pressure bonding, the adhesive forces were measured by a 180° friction pull test. The results are shown in Table 3. The adhesive forces was expressed as a relative strength obtained when the adhesive force of a rubber-based composite material (comparative example) produced by directly bonding the rubber composition to a base material having no plasma polymerized film was supposed to be 1.

In FIG. 1, numeral 1 represents a treatment chamber and numeral 2 represents a monomer and dilution gas supply pipe. Feeding a monomer gas and dilution gas into the treatment chamber through the supply pipe 2 and forming a plasma area between electrodes coated with an insulator 3 and 3 by means of a plasma power source 4 results in polymerization of the monomer and formation of a polymerized film on the surface of a base material 5 located between the electrode 3 and 3. Numeral 6 represents an exhaust pipe.

TABLE 1

| Treatment | A | B | C | D |
|---|---|---|---|---|
| Monomer | — | C$_4$H$_6$ (isoprene) | C$_4$H$_6$ (butadiene) | C$_4$H$_6$ (butadiene) |
| Inert gas | — | He | He | He |
| Discharge frequency (kHz) | — | 3 | 3 | 3 |
| Time of Treatment (sec) | — | 60 | 5 | 60 |

TABLE 2

| Ingredients | Parts by weight |
|---|---|
| Natural rubber | 75 |
| Polyisoprene | 25 |
| Carbon black | 60 |
| Zink oxide | 8 |
| Antioxidant (Note 1) | 1 |
| Vulcanization-accelerator (Note 2) | 1 |
| Sulfur | 6 |

TABLE 2-continued

| Ingredients | Parts by weight |
|---|---|
| Plant oil or mineral oil | 2 |

Note 1) N-phenyl-N'-isopropyl-P-phenylenediamine (produced by Oouchi Shinko Co., Ltd.)
Note 2) N-hydroxydiethylene-2-benzothiazole sulfamide (produced by Oouchi Shinko Co., Ltd.)

TABLE 3

| Treatment | Base material | | | | |
|---|---|---|---|---|---|
| | O—PET | Nylon sheet | Nylon cloth | Stainless-steel plate | |
| Adhesive-force (relative value) A | 1.0 | 1.0 | 1.0 | 1.0 | Comp. ex. |
| B | 7.1 | 3.5 | 2.5 | 3.6 | Ex. 1 |
| C | 3.3 | 3.0 | 1.8 | 3.1 | Ex. 2 |
| D | 14.0 | 4.9 | 2.5 | 4.1 | Ex. 3 |

From the above results, it was confirmed that formation of a plasma polymerized film markedly increases the adhesive force.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A method for preparing a rubber-based composite material, comprising:
    polymerizing a hydrocarbon monomer composition by an atmospheric-pressure glow discharge plasma polymerization technique so as to form a polymerized film containing unsaturated bonds therein on the surface of a base material; and
    bonding a rubber composition to said polymerized film by heat pressure bonding so as to join said base material and said rubber together and thereby form said rubber-based composite material;
    wherein said monomer composition is diluted with a gas selected from the group consisting of He, Ar, Ne, N$_2$, H$_2$ and O$_2$ and said plasma is generated by a high-frequency plasma discharge device having external electrodes that are coated with an insulator.

2. A method of making a rubber-based composite material, which comprises:
    forming a polymerized film having unsaturated bonds therein on the surface of a base material by polymerizing at least one monomer selected from the group consisting of saturated hydrocarbons, unsaturated hydrocarbons, and halogen-substituted derivatives thereof, by an atmospheric-pressure glow discharge plasma polymerization technique; and
    bonding a rubber composition directly to said polymerized film without the use of an adhesive by heat pressure bonding such that said rubber composition is internally cross-linked and cross-linking exists between said rubber composition and said unsaturated bonds contained in said polymerized film to thereby form said rubber-based composite material;
    wherein said base material is selected from the group consisting of plastics, rubbers, metals and ceramics.

3. The method according to claim 2, wherein said monomer is a cyclic hydrocarbon.

4. The method according to claim 2, wherein said monomer is an aromatic hydrocarbon.

5. A method of making a rubber-based composite material, which comprises:

forming a polymerized film having unsaturated bonds therein on the surface of a base material by polymerizing at least one monomer by an atmospheric-pressure glow discharge plasma polymerization technique; and bonding a rubber composition directly to said polymerized film without the use of an adhesive by heat pressure bonding such that said rubber composition is internally cross-linked and cross-linking exists between said rubber composition and said unsaturated bonds contained in said polymerized film to thereby form said rubber-based composite material;

wherein said base material is selected from the group consisting of plastics, rubbers, metals and ceramics.

6. The method according to claim 5, wherein the method of generating said plasma is selected from the group consisting of direct current discharge, low-frequency discharge, high-frequency discharge, microwave discharge, and electron cyclotron resonance discharge.

7. The method according to claim 2, wherein said direct current discharge and low-frequency discharge methods are effected by the use of internal electrodes.

8. The method according to claim 2, wherein said microwave discharge is effected by the use of a wave guide.

9. The method according to claim 2, wherein said plasma is generated by a high-frequency plasma discharge method using external electrodes that are coated with an insulator.

10. The method according to claim 2, wherein said high-frequency discharge is effected by the use of internal electrodes, external electrodes, or coils.

11. The method according to claim 6, wherein said external electrodes are coated with an insulator.

12. The method according to claim 5, wherein said monomer is diluted with He, Ar, Ne, $N_2$, $H_2$ or $O_2$.

13. The method of claim 5 wherein said base material is a plate, sheet, fiber or block.

14. The method according to claim 5, wherein said plasma polymerized film has a thickness of 0.001 to 1000 $\mu$m.

15. The method according to claim 14, wherein said film has a thickness of 0.01 to 100 $\mu$m.

16. The method according to claim 5, wherein said monomer is a hydrocarbon.

17. The method according to claim 5, wherein said monomer is selected from the group consisting of saturated hydrocarbons, unsaturated hydrocarbons, aromatic hydrocarbons, and halogen substituted derivatives thereof.

18. The method according to claim 17, wherein said monomer is selected from the group consisting of $C_2H_4$, $C_3H_6$, $C_4H_8$, $C_6H_6$, $C_4H_5Cl$, and $C_7H_8$.

19. The method according to claim 5, wherein said heat pressure bonding is carried out at a temperature of 50° to 300° C. and at a pressure of 0 to 5000 kg/cm$^2$.

20. The method according to claim 19, wherein said heat pressure bonding is carried out at a temperature of 100° to 250° C. and at a pressure of 0 to 300 kg/cm$^2$.

* * * * *